US008859979B2

(12) United States Patent
Peizerat et al.

(10) Patent No.: US 8,859,979 B2
(45) Date of Patent: Oct. 14, 2014

(54) PIXEL MATRIX WITH COMPENSATION OF OHMIC DROPS ON THE POWER SUPPLIES

(75) Inventors: Arnaud Peizerat, Grenoble (FR); Marc Arques, Grenoble (FR); Jean-Luc Martin, Saint Geoire en Valdaine (FR)

(73) Assignee: Commissariat a l'Energie Atomique, Paris (FR)

(*) Notice: Subject to any disclaimer, the term of this patent is extended or adjusted under 35 U.S.C. 154(b) by 1099 days.

(21) Appl. No.: 12/242,057

(22) Filed: Sep. 30, 2008

(65) Prior Publication Data

US 2009/0085141 A1 Apr. 2, 2009

(30) Foreign Application Priority Data

Oct. 1, 2007 (FR) ...................................... 07 57976

(51) Int. Cl.
*G01T 1/24* (2006.01)
*H01L 25/00* (2006.01)
*H01L 27/00* (2006.01)
*H04N 5/32* (2006.01)
*H04N 5/369* (2011.01)
*H04N 5/374* (2011.01)

(52) U.S. Cl.
CPC ............... *H04N 5/32* (2013.01); *H04N 5/3698* (2013.01); *H04N 5/374* (2013.01)
USPC .................. 250/370.14; 250/370.08

(58) Field of Classification Search
CPC .......... G01T 1/24; G01T 1/247; H01G 9/004; H01G 9/20; H01G 9/2068; H01G 9/2081; H01G 9/28; H01G 2009/00; H01G 2009/0412
USPC .............. 250/370.1, 370.14, 370.08; 345/205
See application file for complete search history.

(56) References Cited

U.S. PATENT DOCUMENTS

| 4,163,161 | A | 7/1979 | Walker | |
|---|---|---|---|---|
| 7,570,257 | B2 * | 8/2009 | Ikeda | 345/204 |
| 7,774,152 | B2 * | 8/2010 | Hamamoto | 702/64 |
| 2003/0146389 | A1 | 8/2003 | Busse et al. | |
| 2004/0178349 | A1 | 9/2004 | Kameshima | |
| 2007/0205802 | A1 | 9/2007 | Perisetty | |
| 2010/0289779 | A1 * | 11/2010 | Routley et al. | 345/205 |

FOREIGN PATENT DOCUMENTS

EP 0 952 615 A1 10/1999

OTHER PUBLICATIONS

French Search Report.

* cited by examiner

*Primary Examiner* — David Porta
*Assistant Examiner* — Carolyn Igyarto
(74) *Attorney, Agent, or Firm* — Pearne & Gordon LLP

(57) ABSTRACT

A matrix microelectronic device includes elementary cells laid out according to a matrix. Each cell has a current source formed by a current source transistor. A source electrode of the transistor is connected to a source biasing conductor line of a plurality of source biasing conductor lines. A gate electrode of the transistor is connected to a gate biasing conductor line of a plurality of gate biasing conductor lines. A biasing device biases the gate biasing conductor lines and includes at least one first connection line that is connected to at least several of the gate biasing conductor lines. The biasing device includes a voltage generator or a current generator that causes a variation of potentials along the first connection line, thereby compensating a corresponding variation of potentials along the source biasing conductor lines. The device can include an addressing circuit for addressing horizontal lines or rows of the matrix.

11 Claims, 3 Drawing Sheets

PIXEL MATRIX WITH COMPENSATION OF OHMIC DROPS ON THE POWER SUPPLIES

TECHNICAL FIELD

The invention relates to the field of microelectronic devices formed by elementary cells or matrix pixels and especially applies to large matrices that have a current source in each pixel, for example X-ray detector matrices.

The invention permits homogeneous consumption and performances to be obtained between the pixels or elementary cells of a matrix device in which the cells are respectively equipped with a current source.

The invention provides for the use of a matrix microelectronic device formed by elementary cells respectively comprising a current source whose consumption depends on a difference of two biasing potentials, and means for compensating an ohmic drop in one or several lines carrying one of said two potentials to the pixels.

STATE OF THE PRIOR ART

In a matrix microelectronic device, such as an X-ray detector matrix, the signals sent from the elementary cells or pixels of the matrix are generally read by scanning the horizontal lines or rows of the matrix. A selection of a given line or given horizontal row of the matrix may for example permit the output signals from the pixels of this given line to be obtained on the vertical columns or rows of the matrix.

The power supply or pilot voltages are supplied to the pixels, by means of a conductive network that may be for example in the form of conductive lines, or conductive gates. The power supply or pilot voltages undergo ohmic drops in this conductive network, which may, on large matrices, reach several tens of millivolts or even more.

An example of an X-ray detection matrix microelectronic device, formed by a 2*2 matrix, of 2 horizontal rows and 2 vertical rows of elementary cells also called pixels $10_{11}, 10_{12}, 10_{21}, 10_{22}$, is illustrated in FIG. 1. In this device, the consumption of each pixel is mainly that of a current source formed by a transistor $T_1$. This current source is only activated when a horizontal row or line of the matrix is selected. The current supplied by this current source depends on the voltage $Vgs=(Vg-Vs)$ of this transistor $T_1$.

In the case of the current source transistor $T_1$ being biased in low inversion, its current Ids between drain and source may be defined by the following relationship: $Ids=(I_0 * e^{(Vgs/(kT/q))})$ where:

$I_0$: a constant which especially depends on the geometry of the transistor T,

K: the Boltzmann constant,

T: the temperature in Kelvin's, q: the charge.

This relation shows that the current Ids is likely to vary very quickly, for example by a factor of 2 for a relatively low variation of the voltage gate-source Vgs, of around 18 mV, at ambient temperature.

In a case where the transistor $T_1$ is biased with high inversion, the equation defining the current Ids is different, but the problem is the same. The application of the potential Vg to the gate of the transistor $T_1$, causes very little consumption of current at the gate. Consequently, in a conductive network supplying the potential Vg to all of the gates of the transistor $T_1$ acting as current sources, the ohmic drop is relatively low. In return, the application of the potential Vs to the source of the transistor $T_1$ causes greater consumption of current at the source. The corresponding conductive network designed to carry the current Ids from the source of the transistor $T_1$ may then be subject to major ohmic drops and differ significantly in function of the position of the transistor in the matrix.

The problem is raised to find a new matrix microelectronic device, especially for the detection of electromagnetic radiation, for example X-rays, whose elementary cells or pixels are respectively equipped with a current source, that does not have the disadvantages mentioned above.

DESCRIPTION OF THE INVENTION

The invention relates to a matrix microelectronic device comprising:

a plurality of elementary cells laid out according to a matrix, respectively comprising at least one current source formed by at least one current source transistor, a source electrode of said transistor is connected to a source biasing conductor line among a plurality of source biasing conductor lines, a gate electrode of said transistor is connected to a gate biasing conductor line among a plurality of conductor gate biasing lines, wherein the device is further equipped with means for biasing conductor gate biasing lines comprising:

at least one first connection line that may be connected to one or several of said conductor gate biasing lines, means for generating, current or voltage, positioned on at least one end of said first connection line, and designed to generate a change or evolution or variation, for example a decrease, in the potentials along said first connection line.

The gate biasing lines are provided to connect the respective gate electrodes of the current respective generator transistors of the cells of a row of cells of the matrix.

The source biasing lines are provided to connect the respective sources electrodes of the respective current generator transistors of the cells of a row of cells of the matrix.

The consumption of the current source transistors especially depends on a difference between the gate potential and the source potential of these transistors. This invention thus provides for the use of means to compensate an ohmic drop in one or several lines carrying the source potential of the current transistors by creating a corresponding decrease of the gate potentials, in order to obtain a difference in potentials between gate and source, that is constant from one current source transistor to another. The generating means are provided so that the change or variation of potentials along said first connection line, is able to compensate the decrease in source potentials in one or several source biasing line(s).

According to a first possible embodiment, the generating means are constantly connected to the first connection line and are in the form of voltage generating means comprising means for applying a first potential $vg_1$ to a first end of said first connection line and means for applying a second potential $vg_2$ to a second end of said first connection line, opposite the first end.

The first potential $vg_1$ and the second potential $vg_2$, may be provided in function of at least an estimation of a diminution in potential between the ends of at least one source biasing line.

This estimation may be made experimentally or using a computerised simulation tool.

According to a second possible embodiment, the generating means are means for generating a reference current, one or several rows of the matrix further comprising: at least one additional transistor fitted so as to form current mirrors, respectively with the current generator transistors of the cells of said row of the matrix, wherein the reference current serves as the input current to said current mirrors.

According to this second possible embodiment, said first connection line is connected to a gate biasing conductor line, when the cells connected to this gate biasing conductor line are selected and supply their output signal.

The source biasing lines may be connected to one another by means of a second connection line, wherein the additional transistors are positioned along an additional conductor line connected to said second connection line.

The additional conductor line, may be identical to the source conductor biasing lines.

According to one possibility, one or several rows of the matrix may further comprise: switching means controlled by a cell row selection signal, capable of transmitting, in function of the state of said selection signal, said reference current to the input of the current mirrors of a row. The switching means may be in the form of at least one switching transistor.

According to one possible embodiment, the current gain of the current mirrors may be equal to $1/K$ (where $K>1$), wherein the additional conductor line has a linear resistance equal to or around $1/K$ the linear resistance of the source biasing lines. This permits the impedance to be reduced below which the gate potentials are supplied.

Said first connection line may be provided with a linear resistance that is identical or substantially equal to the respective linear resistance of said source biasing lines.

The transistors of a succession of current source transistors may respectively have a source electrode connected to a same source biasing conductor line, and a gate electrode respectively connected to one of said conductor gate biasing lines.

The generating means and said first connection line may be provided to position the gate electrode potentials of said gate electrodes of said succession of transistors, to different decreasing potentials.

BRIEF DESCRIPTION OF THE DRAWINGS

This invention will be more clearly understood upon reading the description of embodiments provided, purely by way of example and in no way restrictively, in reference to the appended drawings among which.

Figure 1:
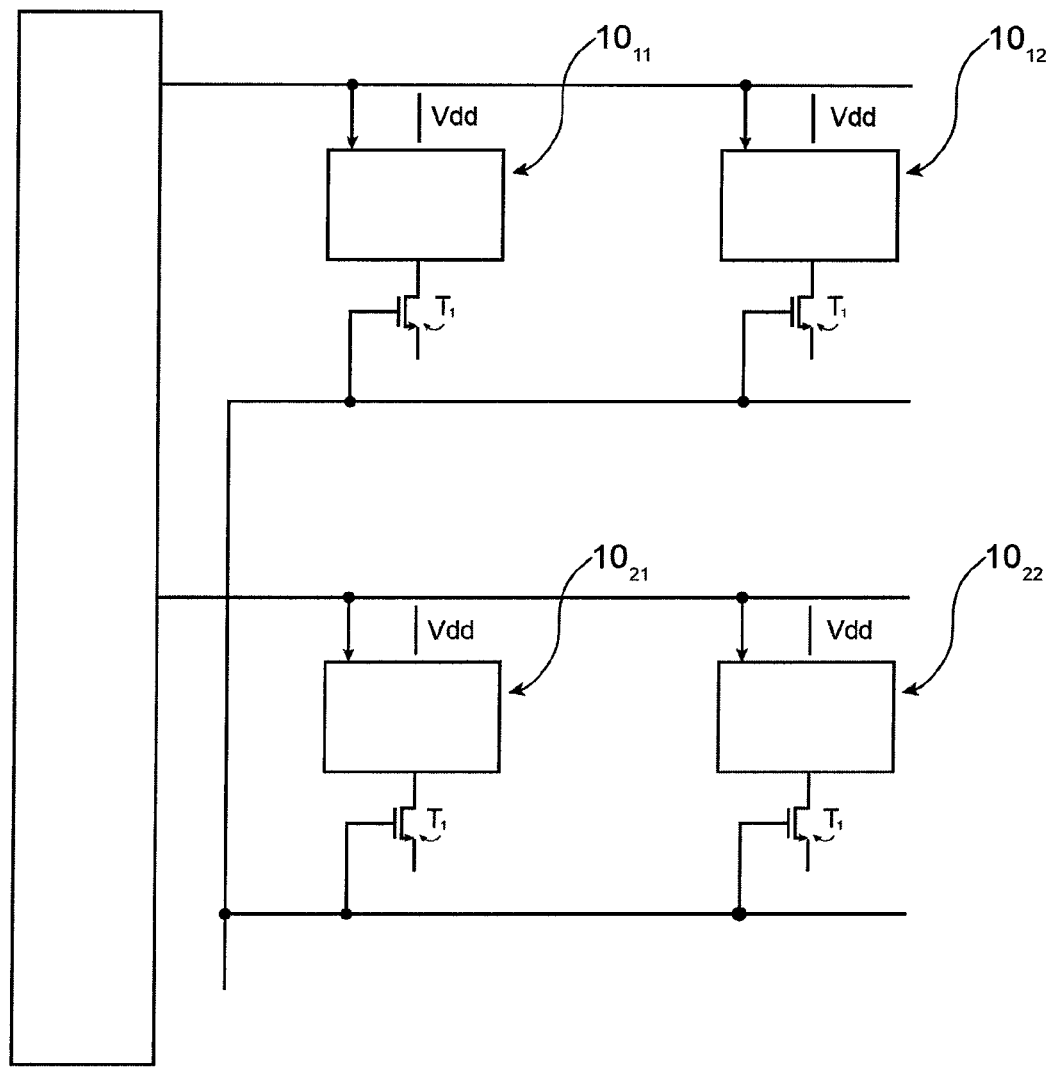
FIG. 1 illustrates a matrix microelectronic device of the prior art.

Identical, similar or equivalent parts in the various figures have the same numerical references in order to facilitate changing from one figure to another.

The various parts shown in the drawings are not necessarily according to a uniform scale, in order to make the figures easier to read.

DETAILED DESCRIPTION OF SPECIFIC EMBODIMENTS

An example of a matrix microelectronic device according to the invention, will now be provided. This device comprises a matrix of n horizontal rows and m vertical rows of elementary cells $100_{11}$, $100_{12}$, ..., $100_{21}$, $100_{22}$, ..., $100_{ij}$, $100_{mn}$, where n may be equal to m, and for example between 1 and 10000, for example equal to 2000.

The elementary cells may be for example electromagnetic radiation sensor pixels and may respectively comprise at least one electromagnetic radiation detector element, for example an X-ray detector, as well as at least one electronic circuit associated to the detector.

According to one variant, the elementary cells may be for example the cells of a reading matrix, wherein the cells are respectively associated to a photoconductive element, for example of the CdTe, CdZnTe, $PbI_2$, $HgI_2$, PbO, Se types, hybridised or assembled or deposited onto the matrix.

The invention may apply to other types of large matrix microelectronic devices, especially to pixel matrices respectively equipped with a current source.

The matrix of elementary cells may be large in size, for example around ten square centimeters or several hundreds of square centimeters, for example a dimension of around 10 cm×10 cm or 20 cm×20 cm.

In the case of a matrix of X-ray detectors, the elementary cells may respectively comprise a photo detector sensitive to visible light for example in the form of a photodiode, or a phototransistor, coupled to one or several CsI, or $Gd_2O_2S$ based flashing layers for example, which permit the X photons to be detected and which transform them into visible photons. Components, for example made using CMOS technology, carry out the detection by transforming the visible photons into electrical charges.

Figure 2:
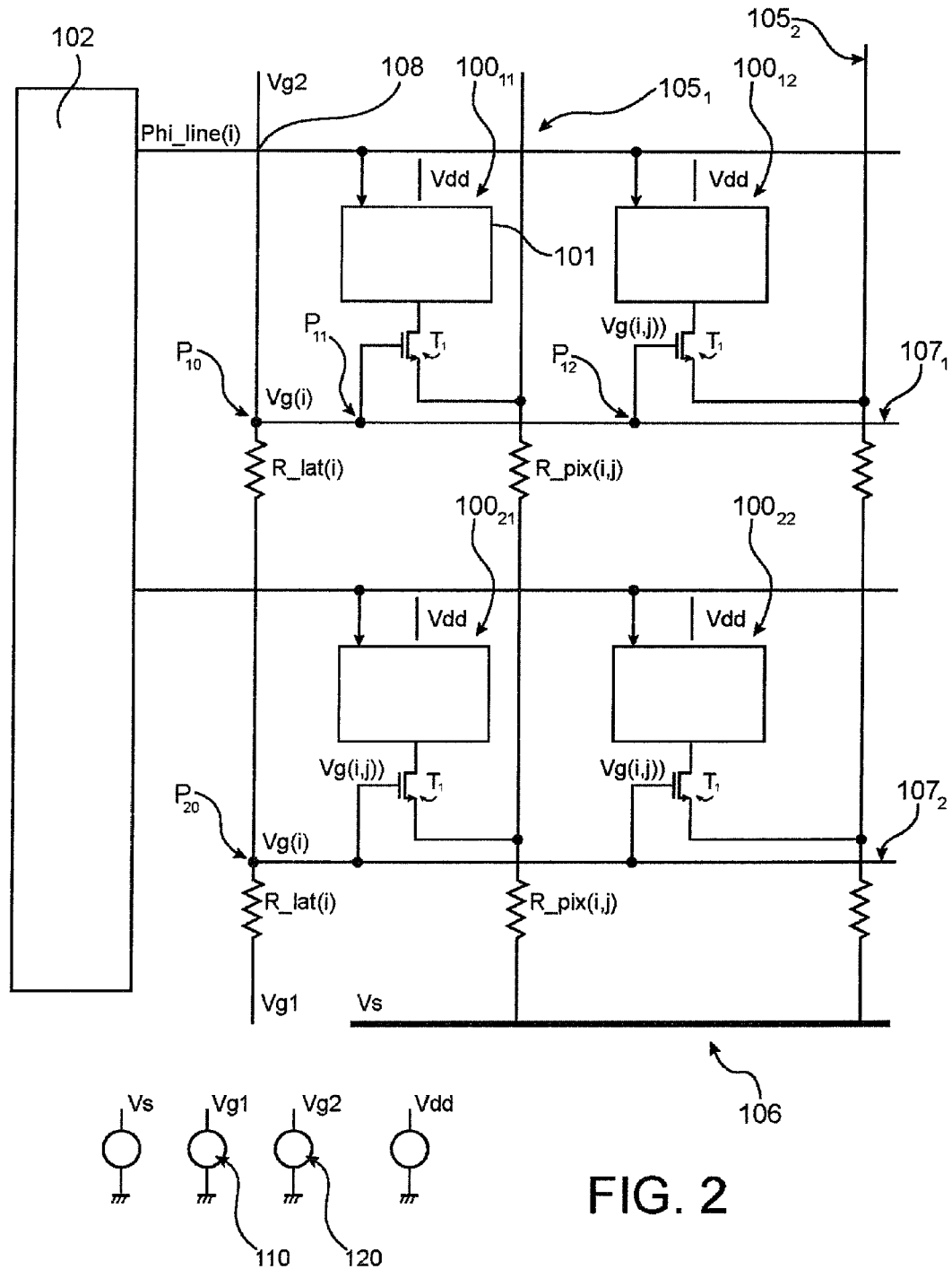
FIG. 2 illustrates a first example of a matrix microelectronic device of the invention.

In FIG. 2, an embodiment is shown where n=2 and m=2 elementary cells or pixels $100_{11}$, $100_{12}$, $100_{21}$, $100_{22}$.

Each elementary cell or pixel of the matrix device may comprise for example a photodiode, as well as a plurality of transistors (the photodiode and the transistors of each pixel are shown diagrammatically in the form of a block with reference 101 in FIG. 2). The device also comprises one or several addressing circuits and in particular at least one addressing circuit 102 for horizontal lines or rows of the matrix, formed for example by one or several offset registers. According to one possible embodiment of the device, the sizes detected by the pixels and translated in the form of signals, may be read line by line, using a selection signal Phi_line(i) of a row i (where $1 \leq i \leq n$) generated by the addressing circuit 102.

Data lines (not shown in this figure) are provided to carry the signals from the cells or pixels of a vertical row or column of the matrix, wherein these signals are then multiplexed.

One or several transistors of each pixel may be connected to a biasing line supplying a power supply potential Vdd.

Each cell or pixel of the matrix also comprises a current source, which may be in the form of a transistor $T_1$, biased so that it is in saturation operation.

Conductor lines $105_1$, $105_2$, for example vertical, are provided to serve as the biasing line of the respective sources of the transistors $T_1$ of each pixel of a row, for example vertical, of the matrix. The source biasing conductor lines $105_1$, $105_2$ may be connected to one another at the edge of the matrix, by means of a connection zone 106. The source biasing lines $105_1$, $105_2$, respectively have a linear resistance noted R_pix (i,j). Along the source biasing lines $105_1$, $105_2$, the potential of the source electrodes of the transistors $T_1$ is likely to decrease.

The connection zone 106 may be in the form of at least one conductor line perpendicular to the source biasing lines $105_1$, $105_2$, set to a potential Vs for example of around 0 V, and provided so that it is sufficiently conductive for the differences in potential at the points of interconnection between the conductive lines $105_1$, $105_2$, and the connection 106 to be negligible, for example at least below 1 mV.

According to one possibility, to render the connection zone 106 sufficiently conductive with respect to the conductor lines $105_1$, $105_2$, or to permit the connection zone 106 to transport a larger current than the conductor lines $105_1$, $105_2$, the connection zone 106 may be made larger, for example ten or several tens of times larger than the conductor lines $105_1$, $105_2$. The connection zone 106 may be provided for example, with a width of around 100 μm whilst the conductor lines $105_1$, $105_2$ are provided with a width of around 2 μm.

The connection zone 106 may also be used on more metallic interconnection levels than the conductor lines $105_1$, $105_2$. For example, the connection zone 106 may be used on 2 interconnection levels using CMOS technology, whilst the conductor lines $105_1$, $105_2$ may be used on a single level.

The connection zone may comprise connector pins spaced out regularly along a conductor line.

Conductor lines $107_1$, $107_2$, for example horizontal, are provided to serve as biasing lines for the respective gates of the current source transistors $T_1$ of each pixel of a row, for example horizontal, of the matrix.

These conductor lines $107_1$, $107_2$ may be connected to one another, by means of a connection zone 108. The connection zone 108 may be in the form of at least one second conductor line, orthogonal to the gate biasing lines $107_1$, $107_2$. The connection zone 108 may have a linear resistance R_lat(i) provided so that the relationship R_lat(i)/R_pix(i,j) is constant. The conductor lines $105_1$, $105_2$ and the conductor line 108 may be designed so that the relationship R_lat(i)/R_pix (i,j) is equal to 1. In this case, the connection zone 108 may be in the form of a conductor line, identical to the conductor lines $105_1$, $105_2$.

The conductor line 108 has one end set to a first potential $Vg_1$, using generating means comprising means 110 permitting the first potential $Vg_1$ to be supplied and another end set to a second potential, for example left free or connected to means 120 permitting a second potential $Vg_2$ to be supplied that is different from the first potential. The second potential $Vg_2$ may be applied using said generating means featuring means 120 permitting the second potential $Vg_2$ to be supplied. According to one example, when Vs is around 0 V, and Rlat is around 1Ω, a pixel current of around 0.1 mA and a number of lines of around 2000, the potentials $Vg_2$ and $Vg_1$ may be around 0.7 Volts and 0.5 Volts.

By applying different $Vg_1$ and $Vg_2$ potentials to the ends of the conductor line 108, a current is forced into this conductor line 108 that is connected to the gate of the current source transistors $T_1$. A change in potential or a variation of potential or a decrease of potential is created, along the conductor line 108, so as to obtain a different potential at the intersection of each gate conductor line $107_1$, $107_2$ with the second conductor line.

On the device of FIG. 2, the potential at a point $P_{10}$, at the intersection of the first connection zone 108 and a gate biasing line $107_1$, is different from the potential at a point $P_{20}$, at the intersection of the first connection zone 108 and another gate biasing line $107_2$.

The potential along each gate conductor line $107_1$, $107_2$ is substantially the same along its entire length, given that the gate voltage of the current source transistors $T_1$, induces very little consumption. For example, the potential at a point $P_{10}$, at the intersection of the first connection zone 108 and a gate biasing line $107_1$, is substantially equal to the potential at a second point $P_{11}$ of the gate biasing line $107_1$, situated at the gate of a current source transistor $T_1$, and substantially equal to the potential at a third point $P_{12}$ of the gate biasing line $107_1$, situated at the gate of another current source transistor $T_1$.

Two potentials $Vg_2$ and $Vg_1$, may be provided in function of an estimation of the drop in potential between the respective ends of the source biasing lines $105_1$, $105_2$.

This estimation may be made experimentally or for example by computer simulation using software such as Pspice (Cadence) or Eldo (Mentor Graphics).

For example, the two potentials $Vg_2$ and $Vg_1$, may be set so that the difference $Vg_2$–$Vg_1$ between the two potentials, is equal to an estimation of Vs(N)–Vs(1) where 1 and N designate the pixels at the ends of a vertical row of the matrix.

In this way, an ohmic drop in the lines $105_1$, $105_2$, carrying the source potential to a vertical row of pixels of the matrix may be compensated by generating a change or decrease in potential corresponding to a conductor line perpendicular to the lines carrying the gate potential. It is thus possible to obtain a difference between the gate potential and source potential Vg–Vs that is substantially equal for all of the current source transistors $T_1$. It is thus possible to obtain a consumption that is substantially constant from one pixel to another of the matrix.

Figure 3:
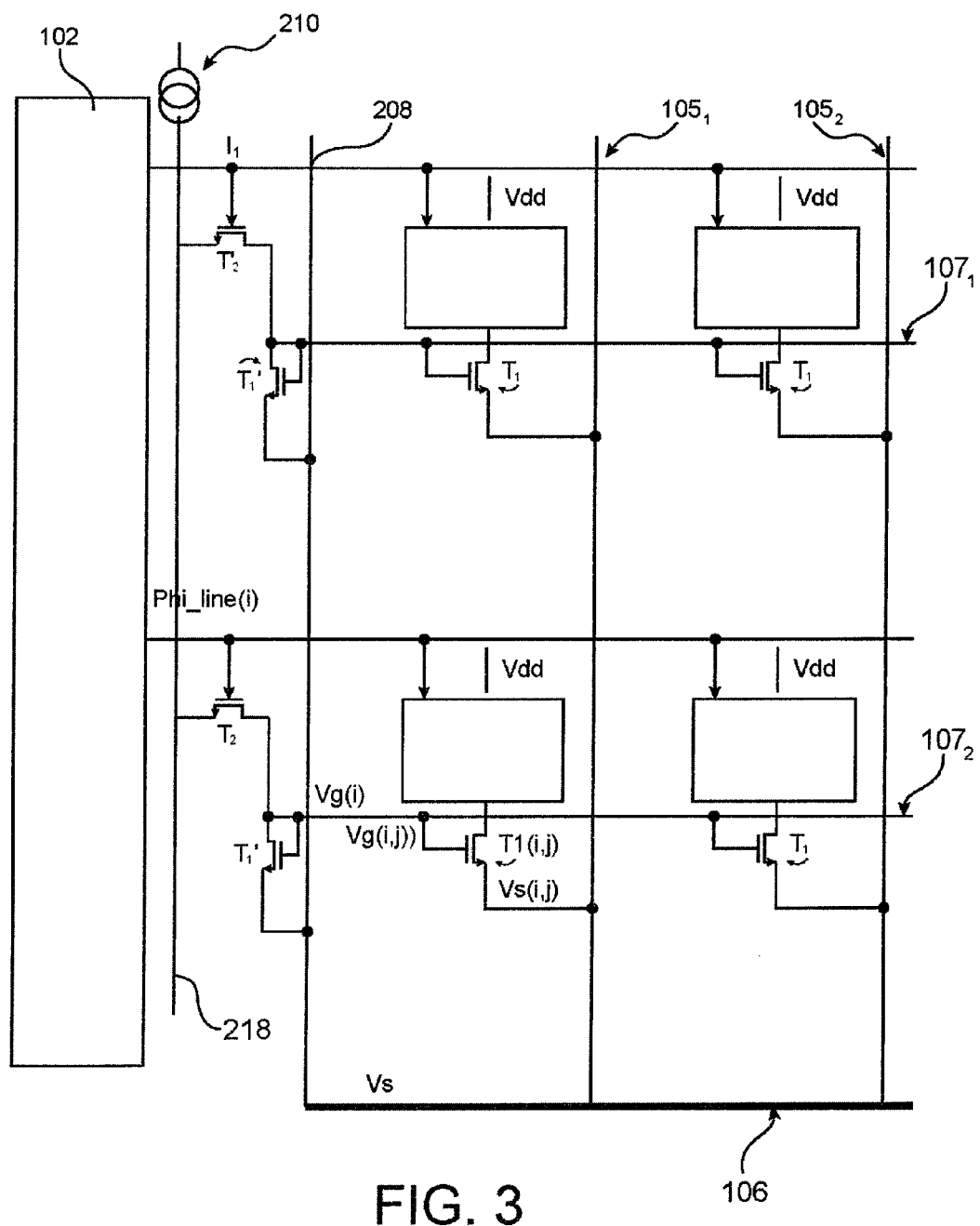
FIG. 3 illustrates a second example of matrix microelectronic device of the invention.

A second example of a device according to the invention is illustrated in FIG. 3.

This device differs from that previously described, especially in that it comprises a conductor line reference 208 (as the conductor line 108 has been removed), that is connected to the first connection zone 106 connecting the source biasing conductor lines $105_1$, $105_2$. The conductor line 208 is preferably identical to the source conductor lines $105_1$, $105_2$, especially in terms of linear resistance, and may be parallel to the latter.

The device is also equipped with means 210 forming a current source $I_1$, for example with the aid of a transistor biased so that it has saturated operation, for example a PMOS transistor with a gate set to a potential Vref and a drain to a potential Vdd. The current source 210 may be placed at the end of a conductor line 218. The current $I_1$ may be supplied to the respective gates of the current source transistors $T_1$ of the pixels of the matrix when these transistors are selected and they then supply an output signal and supply current.

For this purpose, switching transistors $T'_2$ may be provided. The switching transistors $T'_2$ may be controlled by the selection signal phi_line of a horizontal line or row of pixels of the matrix. The switching transistors $T'_2$ may be equipped for example with a gate electrode connected to an addressing circuit output supplying the phi_line line selection signal, wherein a source electrode is connected to the output of the means 210 of generating the current $I_1$, and a drain electrode connected to a line of gate $107_1$ or $107_2$. The device may be provided so that it comprises a switching transistor $T'_2$ per horizontal line or row, that can connect the current source 210 to a gate conductor line $107_1$, $107_2$ of this line or row of the matrix selected.

Each row of the matrix may also comprise an additional transistor $T'_1$ mounted in diode, whose source electrode is connected to the conductor line 208 and whose gate electrodes and drain are connected to one another and to a gate biasing line among the gate biasing lines $107_1$, $107_2$.

The transistor $T'_1$ of a horizontal row or line of the matrix is fitted so that it forms a current mirror set-up with each of the current generator transistors $T_1$ of this horizontal row or line of the matrix.

The operation of such a device may be as follows:

When a line i of the matrix is selected, the current $I_1$ generated by the current generating means 210, passes through the switching transistor $T'_2$ that is made conductive by the activation of the phi_line line selection signal. This current $I_1$ is evacuated by the conductor line 208 to the potential Vs.

The current mirrors of a line are respectively formed by a transistor $T'_1$ mounted in, and a current source transistor $T_1$.

The conductor line 208 may be identical or substantially identical to the source biasing lines $105_1$, $105_2$, especially in terms of linear resistance, and the current mirrors used so that the current $I_1$ is equal to the currents supplied by the pixels, wherein the source potential of the transistor $T'_1$ mounted in diode is established at the same value as the respective source potentials of the current source transistors $T_1$ of this same line.

According to another possibility, the current generating means 210 $I_1$ may be provided so that there is a relationship equal to K between the input current $I_1$ of the current mirror and the output current of the current mirror, supplied by the current source transistor $T_1$ of the pixels.

In this case, the gain of the current mirrors formed by the transistor $T'_1$ and $T_1$ is preferably also provided equal to 1/K, whilst the conductor line 208 may also be provided so that it has a linear resistance K times smaller than that of the source biasing conductor lines $105_1$, $105_2$. This may permit a reduction of the impedance below which the gate voltages are supplied. To obtain current mirrors with such gains, the dimensions W and L, channel width and channel length of the transistors may be adapted, so that the current $I_1$ is K times greater than the current issued from the current source transistors $T_1$.

In the two embodiments that have been described above, a conductor line is used at the edge of the matrix, that may be connected to the gate biasing lines, and in which a evolution in voltage is created that may be identical or proportional to that in the source biasing lines of the matrix.

The ohmic drop phenomena in the source lines are thus compensated and a constant difference is maintained in the different pixels, between the source potential and the gate potential of the current source transistor.

The invention claimed is:

1. Matrix microelectronic device comprising:
a plurality of elementary cells laid out according to a matrix, each elementary cell of said plurality of elementary cells comprising at least one current source formed by at least one current source transistor,
a source electrode of said current source transistor being connected to a source biasing conductor line, wherein the matrix microelectronic device comprises a plurality of source biasing conductor lines each connecting source electrodes of current source transistors of a respective given row of cells of the matrix,
a gate electrode of said current source transistor being connected to a gate biasing conductor line, wherein the matrix microelectronic device comprises a plurality of gate biasing conductor lines each connecting gate electrodes of current source transistors of a respective different row of cells of the matrix that is orthogonal to said given row,
wherein the matrix microelectronic device further comprises: a biasing device for biasing the gate biasing conductor lines, said biasing device comprising:
at least one first connection line that is connected to at least several of said gate biasing conductor lines, and
a voltage generator comprising a first device for applying a first potential to a first end of said first connection line and a second device for applying a second potential to a second end of said first connection line, opposite the first end, wherein said first connection line is provided with a linear resistance that is identical or substantially equal to or proportional to a respective linear resistance of said source biasing conductor lines and said voltage generator causes a decrease of potentials along said first connection line thereby compensating a corresponding decrease of potentials along the source biasing conductor lines.

2. Matrix microelectronic device according to claim 1, the first potential and the second potential being provided in function of at least one estimation of a diminution in potential between the ends of at least one source biasing conductor line.

3. Matrix microelectronic device according to claim 1, wherein a succession of current source transistors each have a source electrode connected to a same source biasing conductor line and a gate electrode connected to one of the gate biasing conductor lines, wherein said voltage generator and said first connection line are provided to set potentials of said gate electrodes of said succession of current source transistors to decreasing potentials.

4. Matrix microelectronic device according to claim 1, further comprising a connection zone connecting together said source biasing conductor lines.

5. Matrix microelectronic device comprising:
a plurality of elementary cells laid out according to a matrix, each elementary cell of said plurality of elementary cells comprising at least one current source formed by at least one current source transistor,
a source electrode of said current source transistor being connected to a source biasing conductor line, wherein the matrix microelectronic device comprises a plurality of source biasing conductor lines each connecting source electrodes of current source transistors of a respective given row of cells of the matrix,
a gate electrode of said current source transistor being connected to a gate biasing conductor line, wherein the matrix microelectronic device comprises a plurality of gate biasing conductor lines each connecting gate electrodes of current source transistors of a respective different row of cells of the matrix that is orthogonal to said given row,
wherein the matrix microelectronic device further comprises: a biasing device for biasing the gate biasing conductor lines, said biasing device comprising:
at least one first connection line that is connected to at least several of said gate biasing conductor lines wherein said first connection line is provided with a linear resistance that is identical or substantially equal or proportional to a respective linear resistance of said source biasing conductor lines, and
a current generator that generates a current flow through the first connection line that causes a decrease of potentials along said first connection line thereby compensating a corresponding decrease of potentials along the source biasing conductor lines.

6. Matrix microelectronic device according to claim 5, wherein one or several rows of cells of the matrix further comprise: at least one additional transistor fitted so as to form current mirrors, respectively with the current source transistors of the cells of said row of the matrix, said current generator generating a reference current, the reference current being an input current to said current mirrors.

7. Matrix microelectronic device according to claim 6, further comprising a connection zone connecting together said source biasing conductor lines and said first connection line.

8. Matrix microelectronic device according to claim 7, the at least one additional transistor being positioned along said first connection line connected to said connection zone.

9. Matrix microelectronic device according to claim 8, said first connection line being identical to the source biasing conductor lines.

10. Matrix microelectronic device according to claim 8, a current gain of the current mirrors being equal to 1/K (where K>1), wherein the first connection line has a linear resistance K times smaller than that of the source biasing conductor lines.

11. Matrix microelectronic device according to claim 6, wherein one or several rows of cells of the matrix further comprise: switching means controlled by a selection signal for selecting a row of cells of the matrix, that can transmit, in function of a state of said selection signal, said reference current to an input of the current mirrors of a row of cells of the matrix.

\* \* \* \* \*